(12) United States Patent
Tamura

(10) Patent No.: US 7,184,208 B2
(45) Date of Patent: Feb. 27, 2007

(54) VARIABLE POWER FINDER AND IMAGING APPARATUS

(75) Inventor: Masaki Tamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/892,097

(22) Filed: Jul. 16, 2004

(65) Prior Publication Data

US 2005/0041284 A1 Feb. 24, 2005

(30) Foreign Application Priority Data

Jul. 18, 2003 (JP) ............................. 2003-276424

(51) Int. Cl.
*G02B 23/00* (2006.01)
*G02B 15/14* (2006.01)

(52) U.S. Cl. ....................... 359/431; 359/432; 359/689

(58) Field of Classification Search ........ 359/420–432, 359/676–692, 831–837, 399, 362–363; 396/373–386
See application file for complete search history.

(56) References Cited

U.S. PATENT DOCUMENTS

| | | | | |
|---|---|---|---|---|
| 3,051,046 A | * | 8/1962 | Thompson .................. | 359/412 |
| 4,909,614 A | * | 3/1990 | Itoh et al. .................. | 359/683 |
| 5,061,054 A | * | 10/1991 | Ohshita ...................... | 359/399 |
| 5,095,326 A | * | 3/1992 | Nozaki et al. .............. | 396/384 |
| 5,144,480 A | * | 9/1992 | Ohshita ...................... | 359/432 |
| 5,231,534 A | | 7/1993 | Kato ........................... | 359/432 |
| 5,576,889 A | * | 11/1996 | Miyazaki .................... | 359/686 |
| 5,640,632 A | * | 6/1997 | Koyama et al. ............ | 396/382 |
| 5,861,986 A | * | 1/1999 | Tanaka et al. .............. | 359/431 |
| 6,041,193 A | * | 3/2000 | Aoki ........................... | 396/379 |
| 6,052,541 A | * | 4/2000 | Nishimura .................. | 396/382 |
| 6,101,030 A | | 8/2000 | Uzawa ........................ | 359/432 |
| 6,118,585 A | * | 9/2000 | Kanai ......................... | 359/557 |
| 6,256,156 B1 | * | 7/2001 | Ruedel et al. .............. | 359/836 |
| 6,282,022 B1 | * | 8/2001 | Abe ............................ | 359/431 |
| 6,643,062 B1 | * | 11/2003 | Kamo ......................... | 359/431 |
| 6,704,128 B2 | * | 3/2004 | Takeyama et al. .......... | 359/15 |
| 6,711,356 B2 | * | 3/2004 | Tanaka ....................... | 396/379 |
| 6,788,343 B1 | * | 9/2004 | Togino ....................... | 348/341 |
| 2001/0033428 A1 | | 10/2001 | Ohno .......................... | 359/684 |

FOREIGN PATENT DOCUMENTS

JP 4-56814 * 2/1992 ................. 359/708

(Continued)

*Primary Examiner*—Thong Q Nguyen
(74) *Attorney, Agent, or Firm*—Oblon, Spivak, McClelland, Maier & Neustadt, P.C.

(57) ABSTRACT

A variable power finder is proposed, which comprises: an objective system; an inverting system; and an ocular system, in order from object side. The third lens group of the objective system is constituted by one lens prism having at least one reflection surface, and following expressions are satisfied:

$$f3/fw \geq 2.5 \qquad (1)$$

$$-1.0 > R32+R31)/(R32-R31) > 1.0 \qquad (2)$$

$$L1/fw^2 \leq 0.45 \ 1/\text{mm} \qquad (3)$$

$$L2/fw^2 \geq 0.03 \ 1/\text{mm} \qquad (4)$$

where f3 is a focal distance of in millimeters (mm) third lens group, fw is a focal distance in mm at wide angle end of objective system, R31 is a curvature radius of object side lens surface of lens prism, R32 is a curvature radius of image side lens surface of lens prism, L1 is an air equivalent distance in mm from middle imaging surface to object side lens surface of lens prism, and L2 is a distance in mm from middle imaging surface to image side lens surface of lens prism.

8 Claims, 10 Drawing Sheets

FOREIGN PATENT DOCUMENTS

| | | |
|---|---|---|
| JP | 07-159865 | 6/1995 |
| JP | 11-326789 | 11/1999 |
| JP | 2001-350090 | 12/2001 |
| JP | 2002-131643 | 5/2002 |
| JP | 2002-131292 | 5/2003 |

* cited by examiner

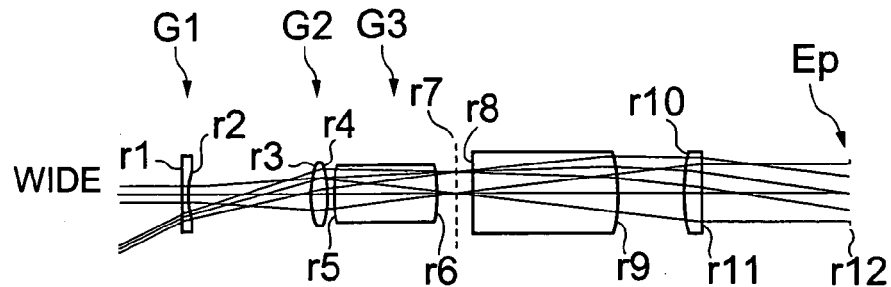
FIG.3A WIDE
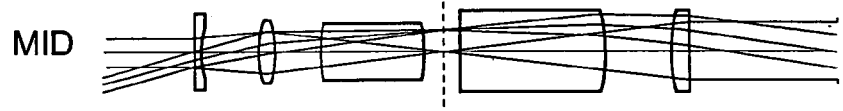
FIG.3B MID
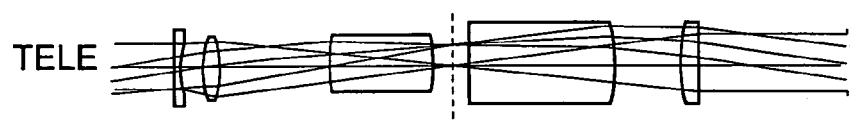
FIG.3C TELE
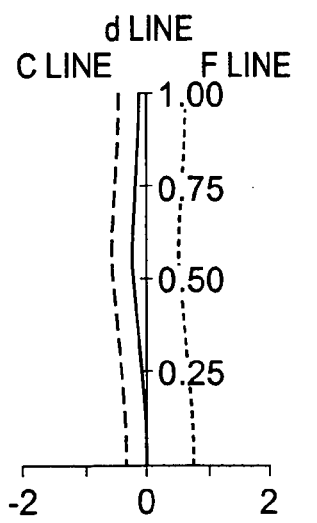
FIG.4A
SPHERICAL
ABBERATION (Dptr)
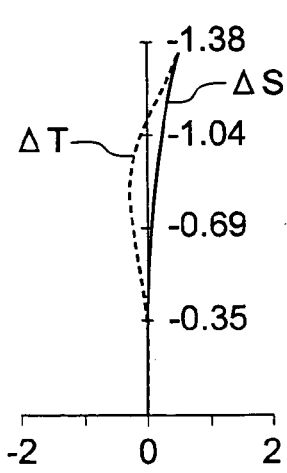
FIG.4B
ASTIGMATISM
(Dptr)
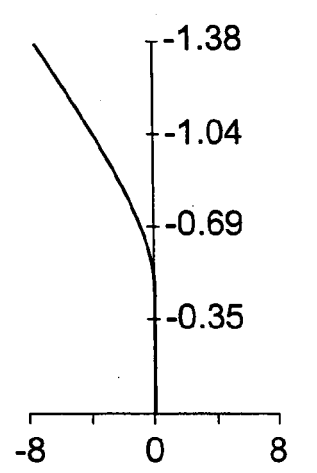
FIG.4C
DISTORTION
ABBERATION (%)

SPHERICAL ABBERATION (Dptr)

ASTIGMATISM (Dptr)

DISTORTION ABBERATION (%)

SPHERICAL ABBERATION (Dptr)

ASTIGMATISM (Dptr)

DISTORTION ABBERATION (%)

FIG.7A WIDE 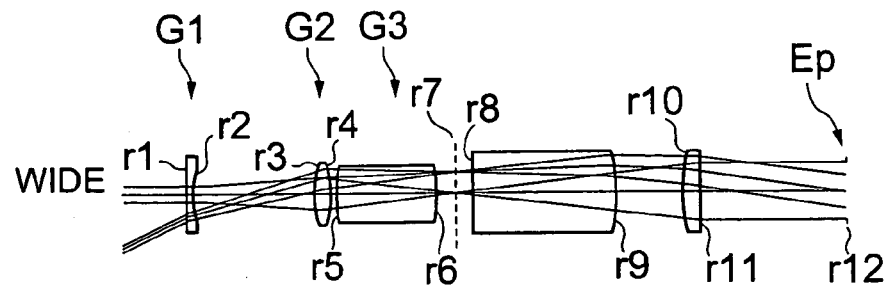
FIG.7B MID 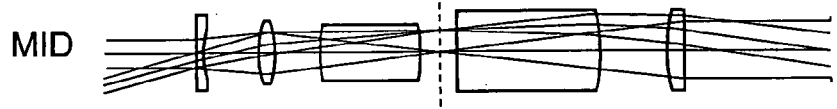
FIG.7C TELE 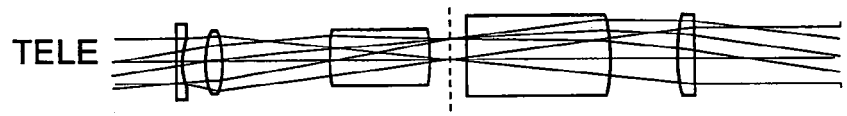

SPHERICAL ABBERATION (Dptr)

ASTIGMATISM (Dptr)

DISTORTION ABBERATION (%)

SPHERICAL ABBERATION (Dptr)

ASTIGMATISM (Dptr)

DISTORTION ABBERATION (%)

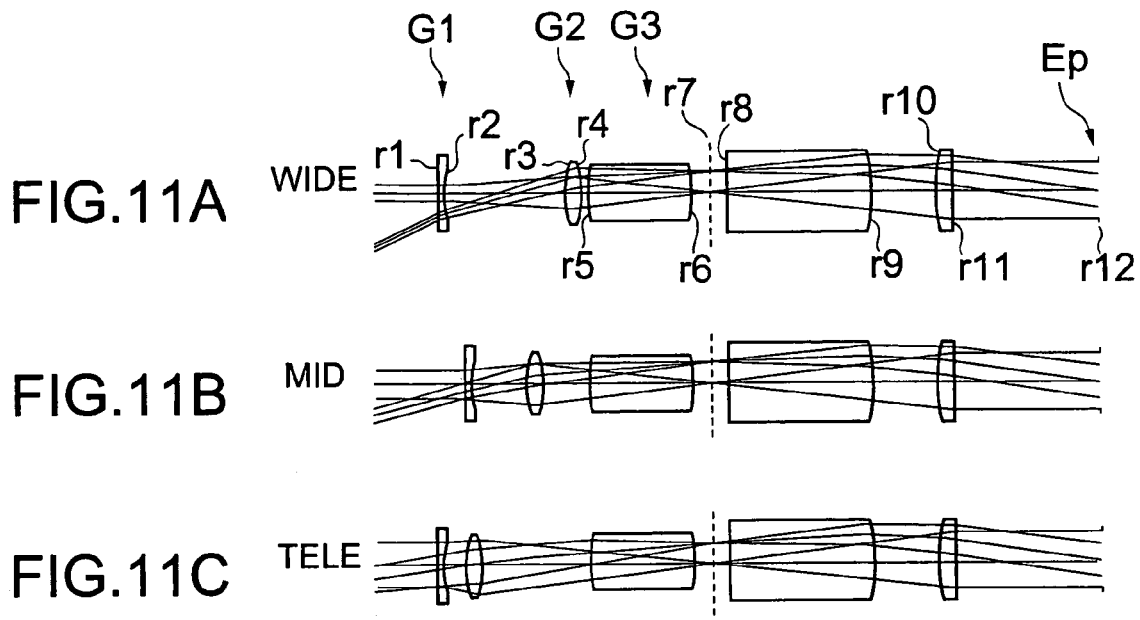
FIG.11A WIDE
FIG.11B MID
FIG.11C TELE
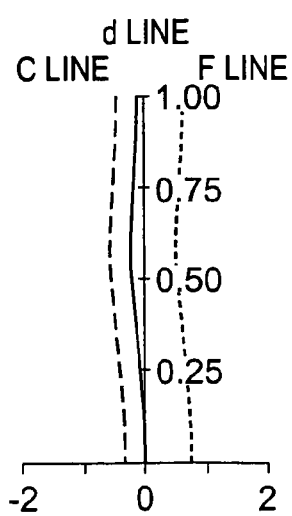
FIG.12A
SPHERICAL ABBERATION (Dptr)
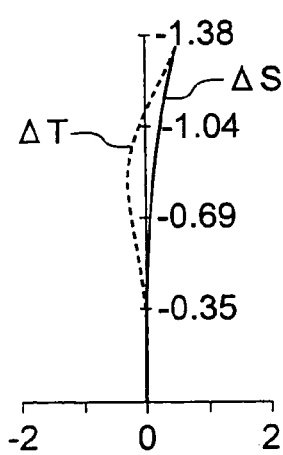
FIG.12B
ASTIGMATISM (Dptr)
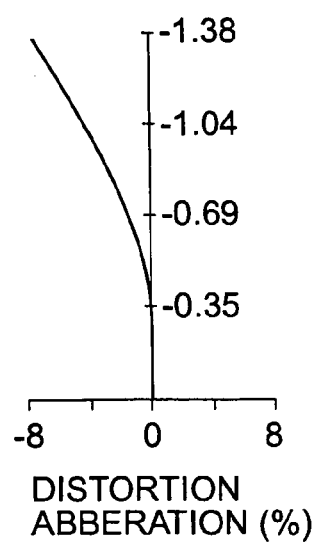
FIG.12C
DISTORTION ABBERATION (%)

SPHERICAL ABBERATION (Dptr)

ASTIGMATISM (Dptr)

DISTORTION ABBERATION (%)

SPHERICAL ABBERATION (Dptr)

ASTIGMATISM (Dptr)

DISTORTION ABBERATION (%)

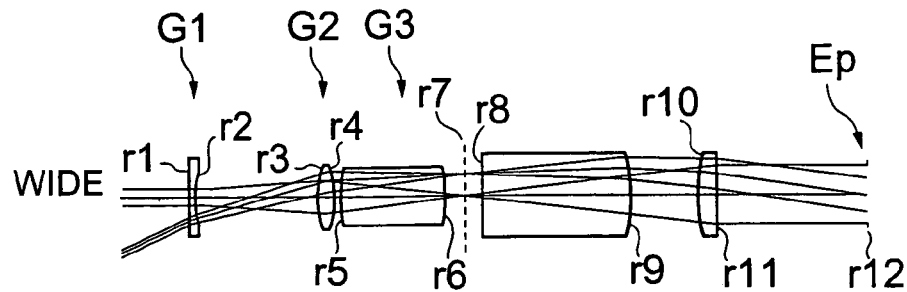
FIG.15A WIDE
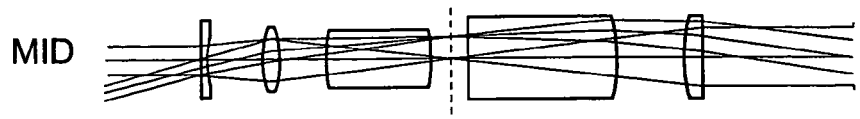
FIG.15B MID
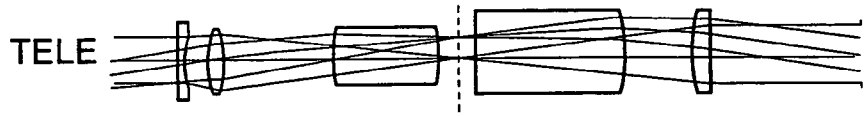
FIG.15C TELE
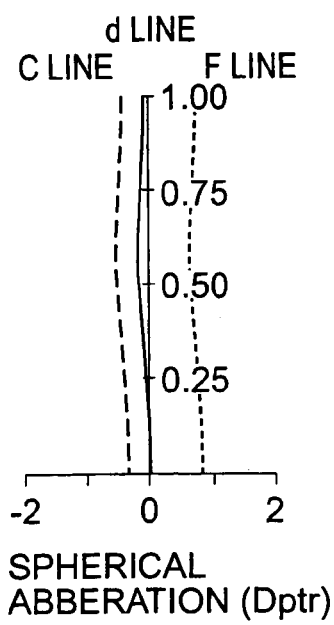
FIG.16A
SPHERICAL ABBERATION (Dptr)
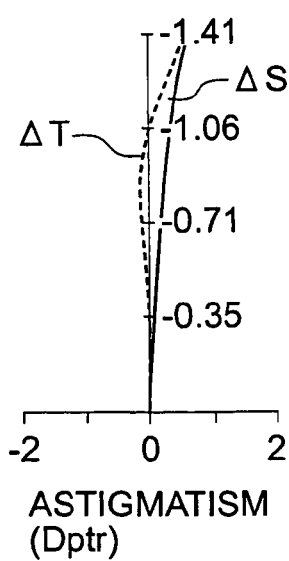
FIG.16B
ASTIGMATISM (Dptr)
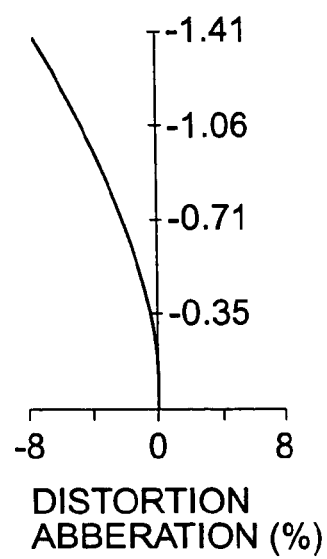
FIG.16C
DISTORTION ABBERATION (%)

SPHERICAL
ABBERATION (Dptr)

ASTIGMATISM
(Dptr)

DISTORTION
ABBERATION (%)

SPHERICAL
ABBERATION (Dptr)

ASTIGMATISM
(Dptr)

DISTORTION
ABBERATION (%)

VARIABLE POWER FINDER AND IMAGING APPARATUS

BACKGROUND OF THE INVENTION

1. Field of the Invention

The present invention relates to a variable power finder, and more particularly to a variable power finder suitable for a digital camera or the like, which is small in size and has an excellent optical performance, and also to an imaging apparatus using the same.

2. Related Art

Conventionally, in a camera in which a photographing system and a finder system are separately configured, where the photographing system has a variable power function, the variable power function corresponding to the variation in an imaging angle of view is also configured in the finder system. As the above-mentioned finder system, real image type variable power finders, in which the visibility of a view frame is good and a predetermined variable power ratio is easily obtained, are variously proposed.

As the real image type variable power finder, those disclosed in Patent Document 1 and Patent Document 2 below are known. They are provided with a negative first lens group, a positive second lens group and a positive third lens group, as an objective optical system. They try to shorten the entire length by dividing an inverting optical system which converts an inverted image taken by the objective optical system into an erecting image and by displacing a part of reflection unit to a back focus unit of the objective optical system.

Also, in Patent Document 2, it is designed to further shorten the entire length by placing a third lens group on the incident surface of the inverting optical system.

[Patent Document 1] Japanese Patent Application Publication No. JP-A-Heisei 1-116616

[Patent Document 2] Japanese Patent Application Publication No. JP-A-Heisei, 4-194913

However, the trend toward compact models of the digital cameras in recent years has been progressed more than expected, and the further reduction in the entire length of the objective optical system is required. So, in order to attain the further miniaturization from the present situation, it is necessary to make the refractive force of each lens group stronger. However, it is very difficult to excellently compensate the various aberrations induced in the respective lens groups while maintaining the predetermined variable power ratio.

SUMMARY OF THE INVENTION

The present invention is proposed in order to solve the above-mentioned problems. That is, the present invention is provided with: an objective optical system having a positive refractive force; an inverting optical system for converting an inverted image taken by the objective optical system into an erecting image; and an ocular optical system having a positive refractive force to observe the erecting image obtained by the inverting optical system, arranged in the order from the object side. The objective optical system is composed of a negative first lens group, a positive second lens group and a positive third lens group. This is the variable power finder for displacing the second lens group onto an optical axis, performing the variable power and compensating the visibility change caused by the variable power performed through the displacement of the first lens group. The third lens group is constituted by one lens prism having at least one reflection surface. And, the following expressions (1) to (4) are satisfied.

$$f3/fw \geq 2.5 \quad (1)$$

$$-1.0 < (R32+R31)/(R32-R31) < 1.0 \quad (2)$$

$$L1/fw^2 \leq 0.45 \text{ 1/mm} \quad (3)$$

$$L2/fw^2 \geq 0.03 \text{ 1/mm} \quad (4)$$

Here, f3 in the above-mentioned expressions is a focal distance in millimeters (mm) of the third lens group, fw is a focal distance in mm at a wide angle end of the objective optical system, R31 is a curvature radius of an object side lens surface of the lens prism, R32 is a curvature radius of an image side lens surface of the lens prism, L1 is an air equivalent distance in mm from a middle imaging surface to the object side lens surface of the lens prism, and L2 is a distance in mm from the middle imaging surface to the image side lens surface of the lens prism.

In the above-mentioned present invention, the expression (1) sets the ratio of the focal distance of the third lens group to the focal distance at the wide angle end of the objective optical system. The expression (2) defines the shape of the lens prism constituting the third lens group as the lens shape of both convexes. The expression (3) sets the ratio of the air equivalent distance to the object side lens surface of the lens prism from the middle imaging surface to the square of the focal distance at the wide angle end of the objective optical system. And, the expression (4) sets the ratio of the distance to the image side lens surface of the lens prism from the middle imaging surface to the square of the focal distance at the wide angle end of the objective optical system. By satisfying those expressions, it is possible to provide the variable power finder which is small in size and excellent in mass production and has the good optical performance.

The present invention can attain the real image type finder which is small in size, good in optical performance, rid of visible dust, suitable for mass production, and high in variable power. It is possible to miniaturize the imaging apparatus, such as a digital still camera or the like, to make the performance high and to make its cost down.

The variable power finder of the present invention can be installed in the body of and applied to the imaging apparatus, such as a digital still camera, a digital video camera or the like.

BRIEF EXPLANATION OF THE DRAWINGS

FIG. 3A to 3C are configuration views of an optical system corresponding to Example 1.

FIG. 4A to 4C are aberration views corresponding to a wide angle end (WIDE) of Example 1.

FIG. 7A to 7C are configuration views of an optical system corresponding to Example 2.

FIG. 11A to 11C are configuration views of an optical system corresponding to Example 3.

FIG. 12A to 12C are aberration views corresponding to a wide angle end (WIDE) of Example 3.

FIG. 15A to 15C are configuration views of an optical system corresponding to Example 4.

FIG. 16A to 16C are aberration views corresponding to a wide angle end (WIDE) of Example 4.

DESCRIPTION OF THE PREFERRED EMBODIMENTS

Figure 1:
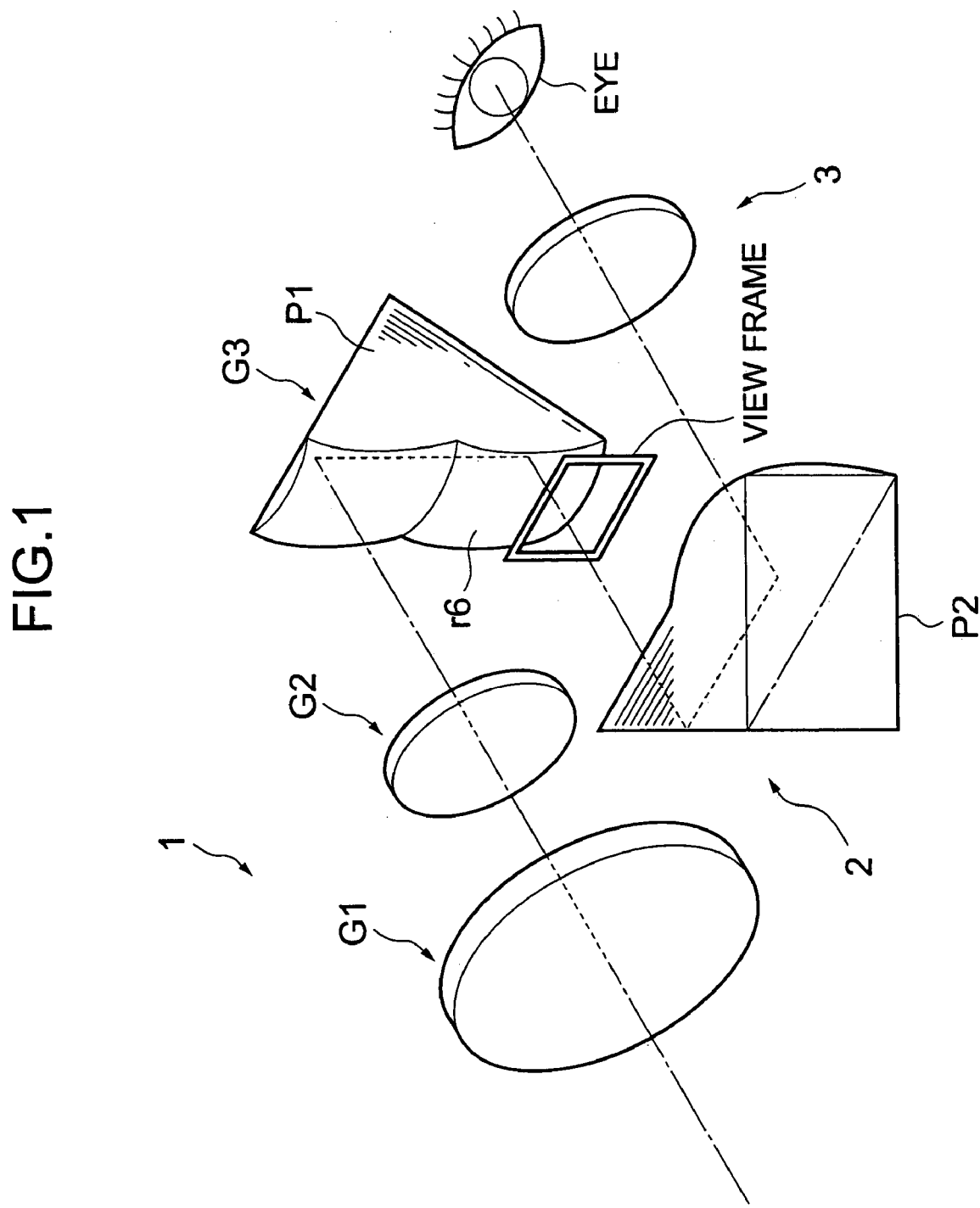
FIG. 1 is a schematic perspective view explaining a variable power finder according to a first embodiment of the arrangement.
Figure 2:
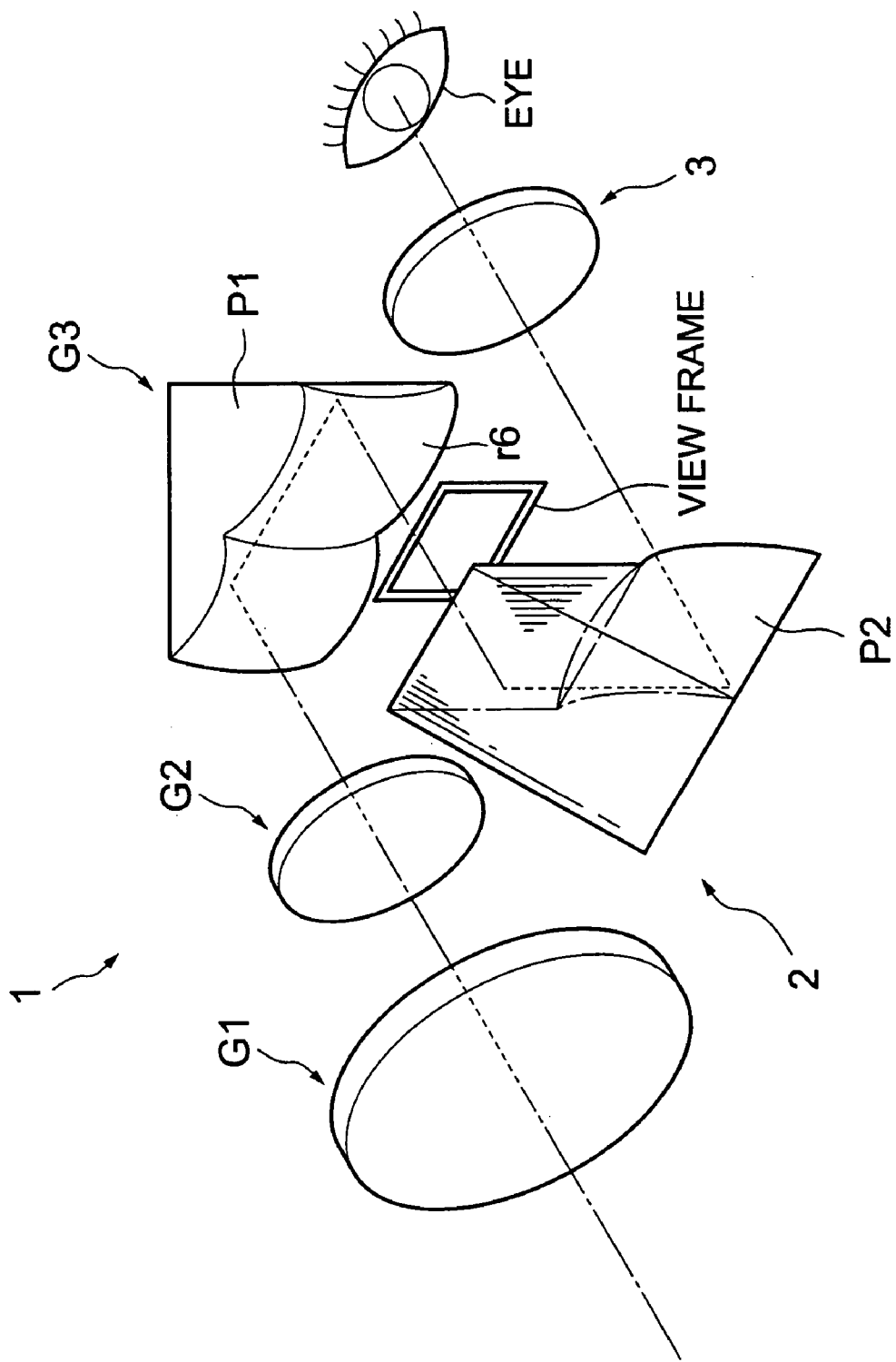
FIG. 2 is a schematic perspective view explaining a variable power finder according to a second embodiment of the arrangement.

Embodiments and examples of the present invention will be described below with reference to the drawings. FIG. 1 is a schematic perspective view explaining a variable power finder according to a first embodiment of the arrangement, and FIG. 2 is a schematic perspective view explaining a variable power finder according to a second embodiment of the arrangement.

The variable power finders according to these embodiments are provided with: an objective optical system 1 having a positive refractive force; an inverting optical system 2 for converting an inverted image taken by the objective optical system 1 into an erecting image; and an ocular optical system 3 having a positive refractive force to observe the erecting image obtained by the inverting optical system, in the order from the object side.

Among them, the objective optical system 1 is composed of a negative first lens group G1 constituted by one concave lens, a positive second lens group G2 constituted by one convex lens and a positive third lens group G3 constituted by one convex lens. The variable power is carried out by displacing the second lens group G2 from a pupil side to an object side, and compensates the visibility change in the finder caused by the that by displacing the first lens group G1 so that the convex locus is drawn onto the pupil side. By the way, the third lens group G3 is fixed when the variable power is carried out.

Also, the third lens group G3 is constituted by a lens prism P1 having two reflection surfaces, and this is designed to shorten the entire length of the variable power finder. In the first embodiment shown in FIG. 1, the lens prism P1 of the third lens group G3 is used to reflect an image to a vertical direction, and a prism P2 is then used to reflect the image to a horizontal direction. On the other hand, in the second embodiment shown in FIG. 2, the lens prism P1 of the third lens group G3 is used to reflect the image to the horizontal direction, and the prism P2 is then used to reflect the image to the vertical direction.

In these embodiments, the third lens group G3 in this objective optical system is designed so as to satisfy the following expressions (1) to (4). Consequently, it enables to attain the real image type of the variable power finder which is excellent in the mass production while having the small size and excellent optical performance.

$$f3/fw \geq 2.5 \quad (1)$$

$$-1.0 < (R32+R31)/(R32-R31) < 1.0 \quad (2)$$

$$L1/fw^2 \leq 0.45 \text{ 1/mm} \quad (3)$$

$$L2/fw^2 \leq 0.03 \text{ 1/mm} \quad (4)$$

Here, f3 is a focal distance in mm of the third lens group G3, fw is a focal distance in mm at a wide angle end of the objective optical system 1, R31 is a curvature radius of a object side lens surface of the lens prism P1, R32 is a curvature radius of an image side lens surface of the lens prism P1, L1 is an air equivalent distance in mm from a middle imaging surface to the object side lens surface of the lens prism P1, and L2 is a distance in mm from the middle imaging surface to the image side lens surface of the lens prism P1.

Also, in these embodiments, the lens prism P1 of the third lens group G3 is designed such that an image side lens surface r6 is at least constituted by the aspherical surface whose curvature is reduced as it gets away from the optical axis, and the second lens group G2 of the objective optical system 1 is designed to satisfy the following expression (5).

$$\beta 2t/\beta 2w \geq 2.5 \quad (5)$$

In the expression (5), $\beta 2$ w is a lateral magnification at the wide angle end of the second lens group G2, and $\beta 2$ t is a lateral magnification at the telescopic end of the second lens group G2.

Here, among the above-mentioned expressions, the expression (1) sets the ratio of the focal distance of the third lens group G3 to the focal distance at the wide angle end of the objective optical system 1, and limits the refractive force of the third lens group G3. If it is less than the lower limit of this expression (1), the refractive force of the second lens group G2 which is responsible for the variable power is reduced. For this reason, in order to obtain the necessary variable power ratio, the displacement of the second lens group G2 becomes great, which makes the entire length long. At the same time, the spherical aberration on the under side generated in the third lens group G3 becomes great, which makes the optical performance poor. Thus, the satisfaction with this expression (1) enables the attainments of the miniaturization of the entire length of the variable power finder and the improvement of the optical property.

Also, the expression (2) defines the shape of the lens prism P1 constituting the third lens group G3 as the lens shape of both convexes, and mainly limits the generation amount of off-axis aberration. The satisfaction with this expression (2) enables the compensation for the off-axis aberration, especially, image surface distortion and distortion aberration.

Also, the expression (3) sets the ratio of the air equivalent distance from the middle imaging surface to the object side lens surface r6 of the lens prism P1 to the square of the focal distance at the wide angle end of the objective optical system 1. The satisfaction with this expression (3) can suppress an optical path length from being excessively long and attain the miniaturization.

Also, the expression (4) sets the ratio of the distance from the middle imaging surface to the image side lens surface r6 of the lens prism P1 to the square of the focal distance at the wide angle end of the objective optical system 1. If this value goes down to the lower limit of this expression (4), the eyes will focus on the dust which is attached on the image side lens surface r6 of the lens prism P1. Consequently, the yield of manufacturing is made poor. Thus, if this expression (4)

is satisfied, it is possible to attain the variable power finder which is suitable for the mass production.

Moreover, in this embodiment, the lens prism P1 of the third lens group G3 is designed such that the image side lens surface r6 is at least constituted by the aspherical surface whose curvature is reduced as it gets away from the optical axis. In short, the image side lens surface r6 in which light flux is made narrow is constituted by the aspherical surface so that the distortion aberration is mainly compensated. Also, in this configuration, since the sensibility to the surface eccentricity of the image side lens surface r6 is low, the manufacturing allowance can be relaxed, thereby attaining the improvement in the mass productivity.

Also, the expression (5) sets the ratio of the lateral magnification between the wide angle end and telescopic end of the second lens group G2. The satisfaction with this expression (5) can provide the real image type variable power finder having high variable power.

EXAMPLE 1

Examples 1 to 4 below will be described referring to the values according to the present invention. In the respective examples, the meanings of the symbols are as follows.

2ω: entire image angle of view in diagonal

Si: the i-th surface counted from object side

Ri: curvature radius of the above i-th surface Si di: distance between the i-th surface and the (i+1)-th surface from object side ni: refractive index in d-line (wavelength 587.6 nm) of the i-th lens v: the Abbe' number of the i-th lens

*: surface where aspherical surface is used

Also, the aspherical shape is defined by the following equation 1, where the depth of the aspherical surface is assumed to be X, and the height from the optical axis is assumed to be H. In the equation 1, A, B, C, and D are the fourth, sixth, eighth and tenth aspherical coefficients, respectively.

$$X = \frac{\frac{H^2}{R}}{1 + \sqrt{1 - \left(\frac{H}{R}\right)^2}} + AH^4 + BH^6 + CH^8 + DH^{10} \quad \text{Equation 1}$$

Figure 5A:
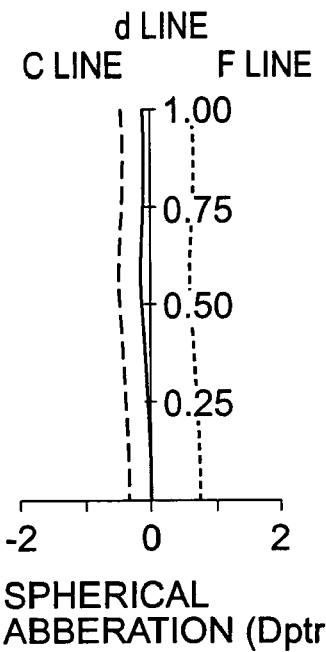
FIG. 5A to 5C are aberration views corresponding to a middle (MID) of Example 1.
Figure 5B:
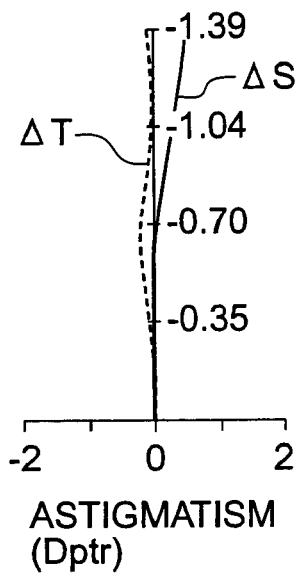
Figure 5C:
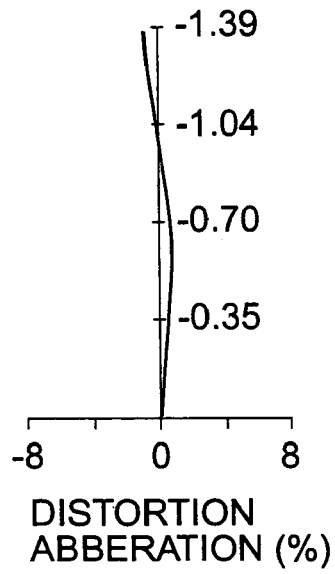
Figure 6A:
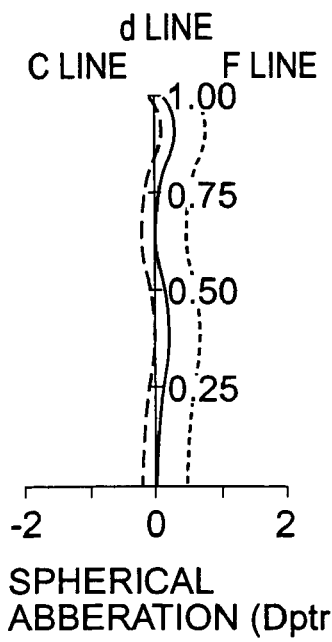
FIG. 6A to 6C are aberration views corresponding to a telescopic end (TELE) of Example 1.
Figure 6B:
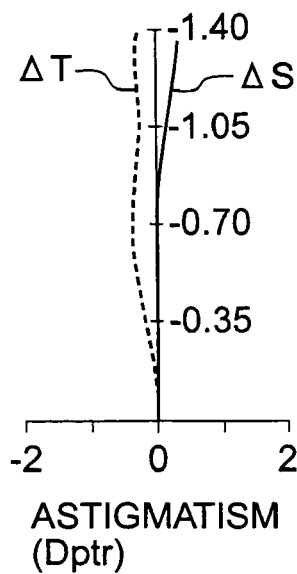
Figure 6C:
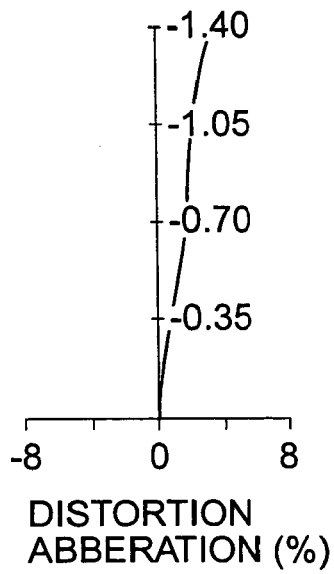

FIG. 3A to 3C are optical system configuration views of a variable power finder according to Example 1. FIG. 4A to 4C are aberration views corresponding to the wide angle end (WIDE) of the variable power finder according to the example 1. FIG. 5A to 5C are aberration views corresponding to the middle (MID) of the variable power finder according to Example 1. And, FIG. 6A to 6C are aberration views corresponding to the telescopic end (TELE) of the variable power finder according to Example 1. Here in Example 1, the configuration of the variable power finder is arranged according to the first embodiment of the arrangement shown in FIG. 1.

Table 1 is the data indicating the configuration of the optical system according to Example 1. Table 2 is the data indicating the aspherical coefficients according to Example 1. Table 3 is the data indicating the change in the distance between the groups caused by the variable power according to Example 1. And, Table 4 is the data indicating the values of the expressions (1) to (5) according to Example 1.

TABLE 1

| 2ω = 51.89° to 18.27° | | | | |
|---|---|---|---|---|
| Si | Ri | di (mm) | ni | vi |
| 1* | −33.839 | 0.80 | 1.5826 | 29.0 |
| 2* | 11.598 | D2 | | |
| 3* | 9.425 | 1.85 | 1.492 | 57.4 |
| 4* | −11.553 | D4 | | |
| 5 | 13.500 | 11.5 | 1.5247 | 56.2 |
| 6* | −17.436 | 2.00 | | |
| 7 | middle imaging surface | 2.00 | | |
| 8 | ∞ | 16.00 | 1.5247 | 56.2 |
| 9 | −15.180 | 7.00 | | |
| 10* | 18.476 | 2.00 | 1.492 | 57.4 |
| 11* | −65.537 | 16.00 | | |
| 12 | eye point | | | |

TABLE 2

| Si | A | B | C | D |
|---|---|---|---|---|
| 1* | −3.32E−04 | 5.50E−05 | −5.89E−06 | 2.67E−07 |
| 2* | −1.22E−03 | 3.08E−04 | −4.99E−05 | 2.93E−06 |
| 3* | −1.07E−03 | 2.27E−04 | −3.48E−05 | 1.61E−06 |
| 4* | −4.12E−04 | 1.89E−04 | −2.93E−05 | 1.33E−06 |
| 6* | 5.42E−03 | −1.51E−03 | 2.42E−04 | −1.39E−05 |
| 10* | 2.04E−04 | −2.25E−05 | 1.97E−06 | −4.80E−08 |
| 11* | 3.50E−04 | −3.87E−05 | 3.20E−06 | −8.05E−08 |

TABLE 3

| di | WIDE | MID | TELE |
|---|---|---|---|
| D2 | 13.18 | 6.19 | 1.99 |
| D4 | 0.50 | 4.83 | 11.95 |

TABLE 4

| | EXPRESSION | VALUE |
|---|---|---|
| (1) | f3/fw | 3.23 |
| (2) | (R32 + R31)/(R32 − R31) | 0.13 |
| (3) | L1/fw^2 | 0.36 l/mm |
| (4) | L2/fw^2 | 0.076 l/mm |
| (5) | β2t/β2w | 2.7 |

EXAMPLE 2

Figure 8A:
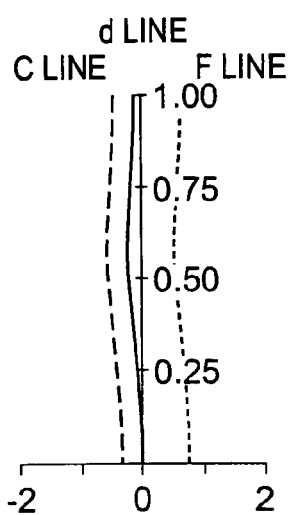
FIG. 8A to 8C are aberration views corresponding to a wide angle end (WIDE) of Example 2.
Figure 8B:
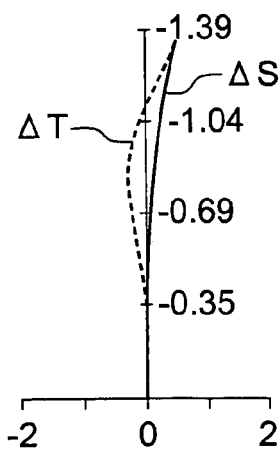
Figure 8C:
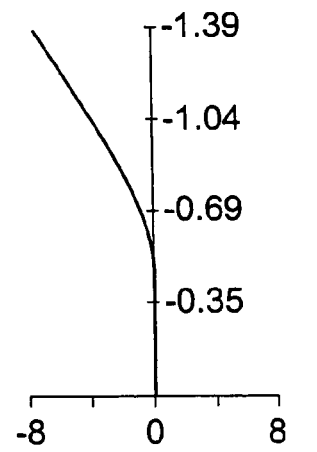
Figure 9A:
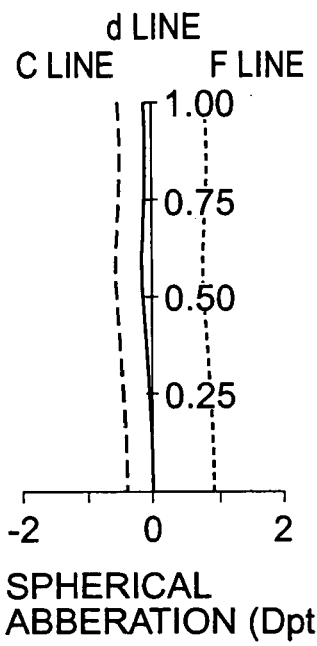
FIG. 9A to 9C are aberration views corresponding to a middle (MID) of Example 2.
Figure 9B:
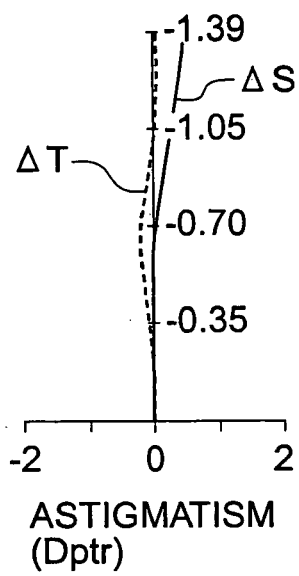
Figure 9C:
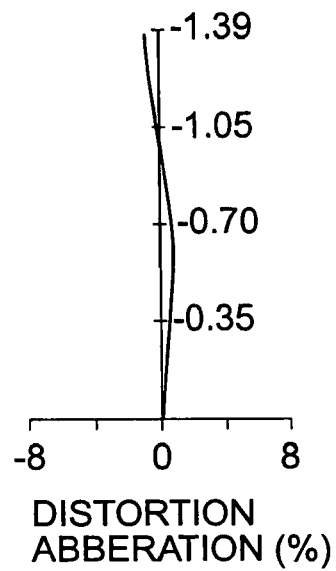
Figure 10A:
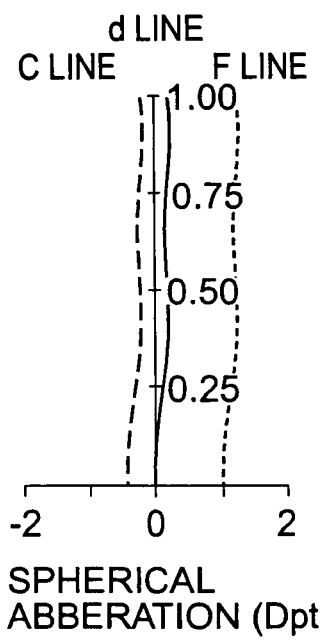
FIG. 10A to 10C are aberration views corresponding to a telescopic end (TELE) of Example 2.
Figure 10B:
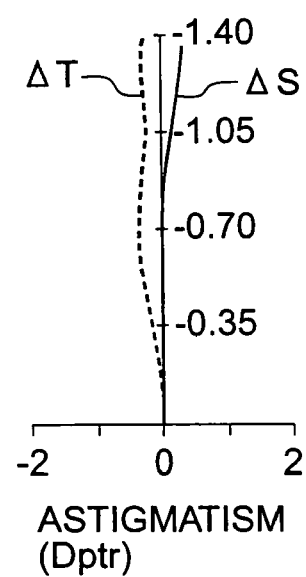
Figure 10C:
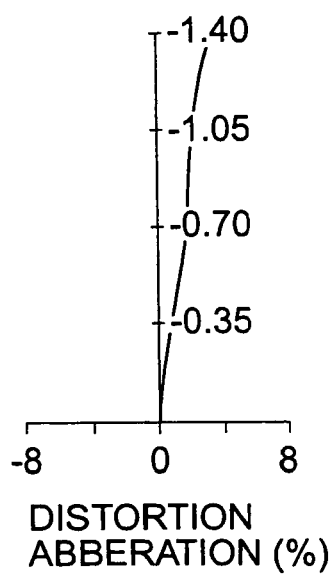

FIG. 7A to 7C are optical system configuration views of a variable power finder according to Example 2. FIG. 8A to 8C are aberration views corresponding to the wide angle end (WIDE) of the variable power finder according to Example 2. FIG. 9A to 9C are aberration views corresponding to the middle (MID) of the variable power finder according to Example 2. And, FIG. 10A to 10C are aberration views corresponding to the telescopic end (TELE) of the variable power finder according to Example 2.

Here in Example 2, the configuration of the variable power finder is arranged according to the first embodiment of the arrangement shown in FIG. 1.

Also, Table 5 is the data indicating the configuration of the optical system according to Example 2. Table 6 is the data indicating the aspherical coefficients according to Example 2. Table 7 is the data indicating the change in the distance between the groups caused by the variable power according to Example 2. And, Table 8 is the data indicating of the expressions (1) to (5) according to Example 2.

TABLE 5

$2\omega = 51.40°$ to $18.23°$

| Si | Ri | di (mm) | ni | vi |
|---|---|---|---|---|
| 1* | −73.532 | 0.8 | 1.492 | 57.4 |
| 2* | 8.044 | D2 | | |
| 3* | 8.911 | 1.85 | 1.492 | 57.4 |
| 4* | −12.288 | D4 | | |
| 5 | 13.7 | 11.50 | 1.5247 | 56.2 |
| 6* | −17.541 | 2.00 | | |
| 7 | middle imaging surface | 2.00 | | |
| 8 | ∞ | 16.00 | 1.5247 | 56.2 |
| 9 | −15.18 | 7.00 | | |
| 10* | 18.295 | 2.00 | 1.492 | 57.4 |
| 11* | −69.939 | 16.00 | | |
| 12 | eye point | | | |

TABLE 6

| Si | A | B | C | D |
|---|---|---|---|---|
| 1* | −1.23E−03 | 1.31E−05 | 8.98E−06 | −6.05E−07 |
| 2* | −2.48E−03 | 2.67E−04 | −3.01E−05 | 1.54E−06 |
| 3* | −1.10E−03 | 2.46E−04 | −3.25E−05 | 1.37E−06 |
| 4* | −4.13E−04 | 2.09E−04 | −2.76E−05 | 1.15E−06 |
| 6* | 4.97E−03 | −1.22E−03 | 1.86E−04 | −1.04E−05 |
| 10* | 2.02E−04 | −2.28E−05 | 1.92E−06 | −4.65E−08 |
| 11* | 3.51E−04 | −4.01E−05 | 3.25E−06 | −8.18E−08 |

TABLE 7

| di | WIDE | MID | TELE |
|---|---|---|---|
| D2 | 13.16 | 6.26 | 2.09 |
| D4 | 0.50 | 4.74 | 11.64 |

TABLE 8

| | EXPRESSION | VALUE |
|---|---|---|
| (1) | f3/fw | 3.24 |
| (2) | (R32 + R31)/(R32 − R31) | 0.12 |
| (3) | L1/fw^2 | 0.36 l/mm |
| (4) | L2/fw^2 | 0.075 l/mm |
| (5) | β2t/β2w | 2.7 |

EXAMPLE 3

Figure 13A:
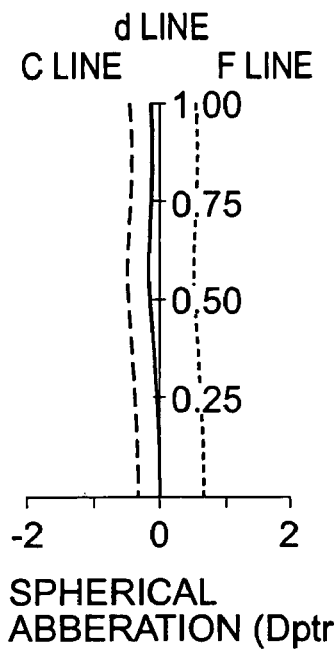
FIG. 13A to 13C are aberration views corresponding to a middle (MID) of Example 3.
Figure 13B:
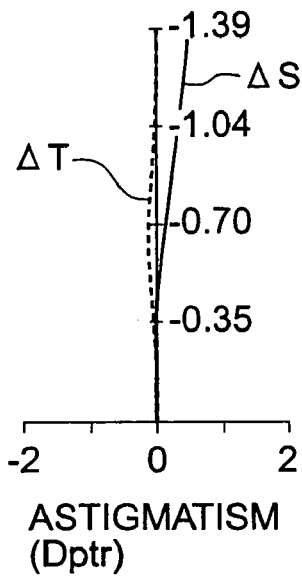
Figure 13C:
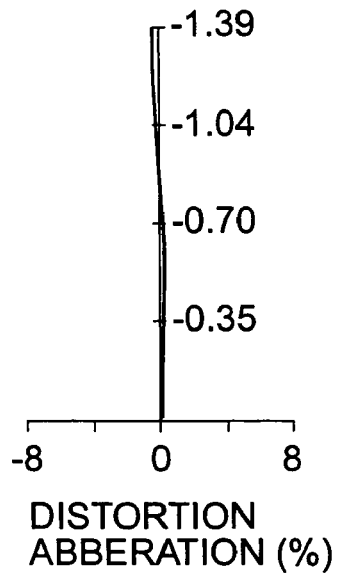
Figure 14A:
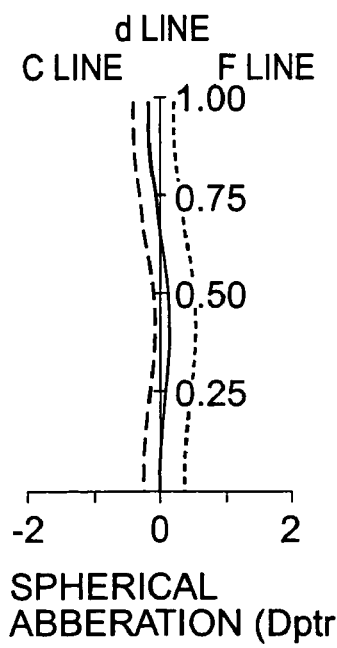
FIG. 14A to 14C are aberration view corresponding to a telescopic end (TELE) of Example 3.
Figure 14B:
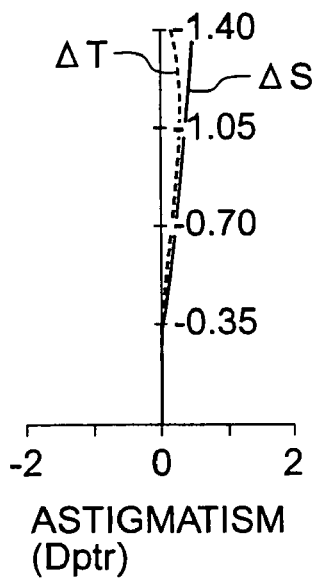
Figure 14C:
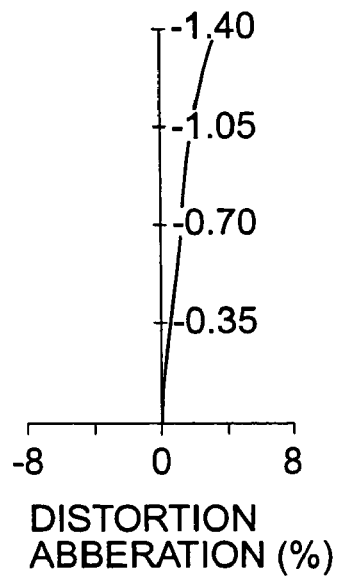

FIG. 11A to 11C are optical system configuration views of a variable power finder according to Example 3. FIG. 12A to 12C are aberration views corresponding to the wide angle end (WIDE) of the variable power finder according to Example 3. FIG. 13A to 13C are aberration views corresponding to the middle (MID) of the variable power finder according to Example 3. And, FIG. 14A to 14C are aberration views corresponding to the telescopic end (TELE) of the variable power according to Example 3. Here in Example 3, the configuration of the variable power finder is arranged according to the second embodiment of the arrangement shown in FIG. 2.

Also, Table 9 is the data indicating the configuration of the optical system according to Example 3. Table 10 is the data indicating the aspherical coefficients according to Example 3. Table 11 is the data indicating the change in distance between the groups caused by the variable power according to Example 3. And, Table 12 is the data indicating the values of the expressions (1) to (5) according to Example 3.

TABLE 9

$2\omega = 51.52°$ to $18.25°$

| Si | Ri | di (mm) | ni | vi |
|---|---|---|---|---|
| 1* | −17.319 | 0.80 | 1.5826 | 29.0 |
| 2* | 14.098 | D2 | | |
| 3* | 9.595 | 2.00 | 1.4920 | 57.4 |
| 4* | −9.804 | D4 | | |
| 5 | 32.6 | 14.50 | 1.5247 | 56.2 |
| 6* | −9.168 | 2.00 | | |
| 7 | middle imaging surface | 2.00 | | |
| 8 | ∞ | 16.00 | 1.5247 | 56.2 |
| 9 | −25.66 | 7.00 | | |
| 10* | 16.984 | 2.00 | 1.4920 | 57.4 |
| 11* | −38.851 | 16.00 | | |
| 12 | eye point | | | |

TABLE 10

| Si | A | B | C | D |
|---|---|---|---|---|
| 1* | 3.97E−04 | −1.40E−04 | 2.41E−05 | −1.27E−06 |
| 2* | −3.56E−04 | 1.14E−05 | 3.52E−06 | −2.01E−07 |
| 3* | −5.07E−04 | 4.46E−05 | −1.09E−05 | 6.01E−07 |
| 4* | 2.10E−04 | 3.05E−05 | −9.18E−06 | 4.97E−07 |
| 6* | 2.95E−03 | −4.43E−04 | 5.92E−05 | −2.83E−06 |
| 10* | 1.92E−04 | −1.76E−05 | 1.77E−06 | −4.04E−08 |
| 11* | 3.53E−04 | −3.21E−05 | 2.87E−06 | −6.83E−08 |

TABLE 11

| di | WIDE | MID | TELE |
|---|---|---|---|
| D2 | 12.85 | 6.32 | 2.32 |
| D4 | 0.50 | 4.47 | 11.04 |

TABLE 12

| | EXPRESSION | VALUE |
|---|---|---|
| (1) | f3/fw | 2.77 |
| (2) | (R32 + R31)/(R32 − R31) | −0.56 |
| (3) | L1/fw^2 | 0.37 l/mm |
| (4) | L2/fw^2 | 0.064 l/mm |
| (5) | β2t/2wβ | 2.7 |

EXAMPLE 4

Figure 17A:
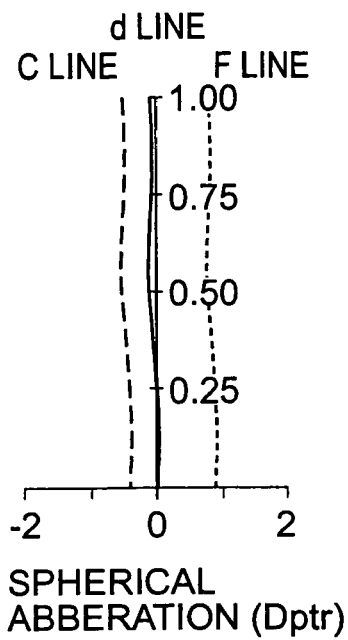
FIG. 17A to 17C are aberration views corresponding to a middle (MID) of Example 4.
Figure 17B:
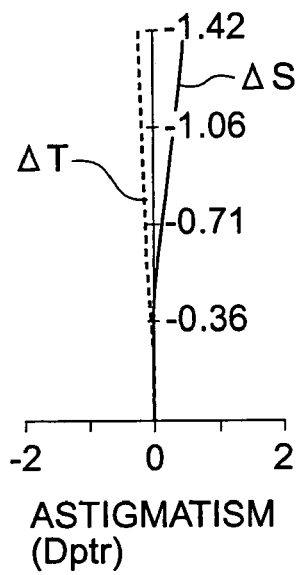
Figure 17C:
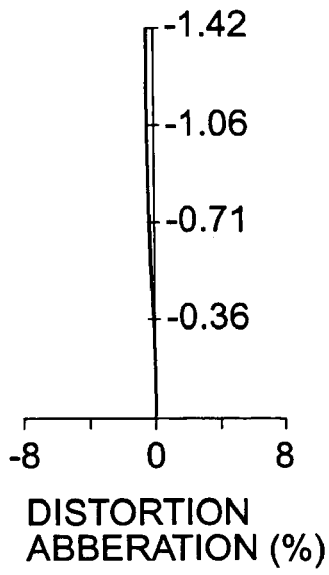
Figure 18A:
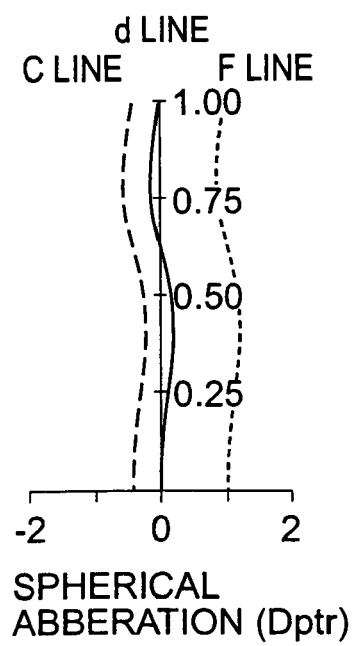
FIG. 18A to 18C are aberration views corresponding to a telescopic end (TELE) of Example 4.
Figure 18B:
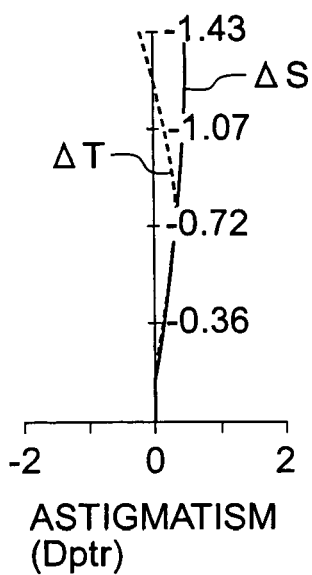
Figure 18C:
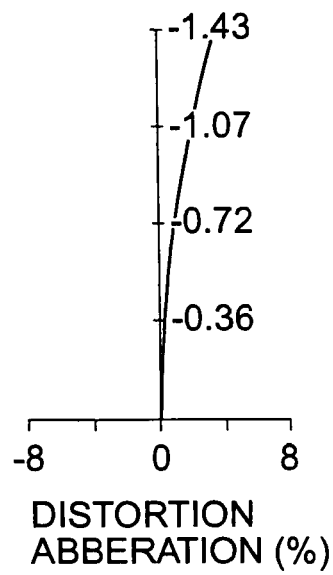

FIG. 15A to 15C are optical system configuration views of a variable power finder according to Example 4. FIG. 16A to 16C are aberration views corresponding to the wide angle end (WIDE) of the variable power finder according to Example 4. FIG. 17A to 17C are aberration views corresponding to the middle (MID) of the variable power finder according to Example 4. And, FIG. 18A to 18C are aberration views corresponding to the telescopic end (TELE) of the variable power finder according to Example 4. Here in Example 4, the configuration of the variable power finder is arranged according to the second embodiment of the arrangement shown in FIG. 2.

Also, Table 13 is the data indicating the configuration of the optical system according to Example 4. Table 14 is the data indicating the aspherical coefficients according to Example 4. Table 15 is the data indicating the change in the distance between the groups caused by the variable power according to Example 4. And, Table 16 is the data indicating the values of the expressions (1) to (5) according to Example 4.

TABLE 13

| Si | Ri | di (mm) | ni |
|---|---|---|---|
| | 2ω = 51.47° to 18.20° | | |
| 1* | −12.3 | 0.80 | 1.4920 |
| 2* | 14 | D2 | |
| 3* | 9.612 | 2.00 | 1.4920 |
| 4* | −9.2 | D4 | |
| 5 | 34.58 | 14.50 | 1.5247 |
| 6* | −8.673 | 2.00 | |
| 7 | middle imaging surface | 2.00 | |
| 8 | ∞ | 16.00 | 1.5247 |
| 9 | −24.1 | 7.00 | |
| 10* | 18.026 | 2.00 | 1.4920 |
| 11* | −37.078 | 16.00 | |
| 12 | eye point | | |

TABLE 14

| Si | A | B | C | D |
|---|---|---|---|---|
| 1* | 4.38E−04 | −8.35E−05 | 2.31E−05 | −1.55E−06 |
| 2* | −3.95E−04 | 5.67E−05 | 5.26E−06 | −6.52E−07 |
| 3* | −5.12E−04 | 7.05E−06 | −8.25E−06 | 5.05E−07 |
| 4* | 2.21E−04 | 1.35E−05 | −9.33E−06 | 5.12E−07 |
| 6* | 1.21E−03 | 1.50E−04 | −1.22E−05 | 2.08E−07 |
| 10* | 2.12E−04 | −2.08E−05 | 1.66E−06 | −3.10E−08 |
| 11* | 3.67E−04 | −3.57E−05 | 2.74E−06 | −5.64E−08 |

TABLE 15

| di | WIDE | MID | TELE |
|---|---|---|---|
| D2 | 11.84 | 5.60 | 1.74 |
| D4 | 0.50 | 4.33 | 10.69 |

TABLE 16

| EXPRESSION | | VALUE |
|---|---|---|
| (1) | f3/fw | 2.61 |
| (2) | (R32 + R31)/(R32 − R31) | 0.6 |
| (3) | L1/fw^2 | 0.35 1/mm |
| (4) | L2/fw^2 | 0.061 1/mm |
| (5) | β2t/β2w | 2.7 |

What is claimed is:

1. A variable power finder comprising:
an objective optical system having a positive refractive force;
an inverting optical system for converting an inverted image taken by said objective optical system into an erecting image; and
an ocular optical system having a positive refractive force to observe said erecting image obtained by said inverting optical system, said objective optical system, said inverting optical system, and said ocular optical system being arranged in order from an object side, wherein
said objective optical system including a negative first lens group, a positive second lens group, and a positive third lens group, an image side lens surface and an object side lens surface of each of the first and second lens group including a respective aspherical surface,
said second lens group configured to be displaced along an optical axis to provide the variable power and to compensate a visibility change caused by said variable power through said displacement of said first lens group, and
said third lens group includes a lens prism having two reflection surfaces on separate sides of the lens prism and two convex refraction surfaces adjacent each other on a common side of the lens prism, said two convex refraction surfaces forming an entrance face and an exit face of the lens prism on said common side, and expressions (1) to (4) below are satisfied:

$$f3/fw \geq 2.5 \quad (1)$$

$$-1.0 < (R32+R31)/(R32-R31) < 1.0 \quad (2)$$

$$L1/fw^2 \leq 0.45 \text{ 1/mm} \quad (3)$$

$$L2/fw^2 \leq 0.03 \text{ 1/mm} \quad (4)$$

where f3 is a focal distance in millimeters (mm) of said third lens group,
fw is a focal distance in mm of said objective optical system measured when said second lens group is displaced along the optical axis at a wide angle end of said variable power,
R31 is a curvature radius of an object side lens surface of said lens prism,
R32 is a curvature radius of an image side lens surface of said lens prism,
L1 is an air equivalent distance in mm from a middle imaging surface to the object side lens surface of said lens prism, and
L2 is a distance in mm from the middle imaging surface to said image side lens surface of the lens prism.

2. A variable power finder according to claim 1, wherein the image side lens surface of said lens prism of said third lens group includes an aspherical surface with a curvature that is reduced farther from the optical axis.

3. A variable power finder according to claims 1 or 2; wherein said second lens group of said objective optical system is configured to satisfy the following expression (5):

$$\beta 2t/\beta 2w \geq 2.5 \quad (5)$$

where β2 w is a lateral magnification at the wide angle end of said second lens group, and β2 t is a lateral magnification at the telescopic end of said second lens group.

4. An imaging apparatus having a variable power finder, said finder comprising:
an objective optical system having a positive refractive force;
an inverting optical system for converting an inverted image taken by said objective optical system into an erecting image; and
an ocular optical system having a positive refractive force to observe said erecting image obtained by said inverting optical system, said objective optical system, said inverting optical system, and said ocular optical system being arranged in order from an object side, wherein
said objective optical system including a negative first lens group, a positive second lens group, and a positive third lens group, an image side lens surface and an object side lens surface of each of the first and second lens group including a respective aspherical surface, said second lens group configured to be displaced along an optical axis to provide variable power and to compensate a visibility change caused by said variable power through said displacement of said first lens group, and said third lens group includes a lens prism having two reflection surfaces on separate sides of the lens prism and two convex refraction surfaces adjacent each other on a common side of the lens prism, said two convex refraction surfaces forming an entrance face and an exit face of the lens prism on said common side opposite, and expressions (1) to (4) below are satisfied:

$$f3/fw \geq 2.5 \tag{1}$$

$$-1.0 > R32+R31)/(R32-R31) > 1.0 \tag{2}$$

$$L1/fw^2 \leq 0.45 \ 1/mm \tag{3}$$

$$L2/fw^2 \geq 0.03 \ 1/mm \tag{4}$$

where f3 is a focal distance in millimeters (mm) of said third lens group, fw is a focal distance in nun of said objective optical system measured when said second lens group is displaced along the optical axis at a wide angle end of said variable power, R31 is a curvature radius of an object side lens surface of said lens prism, R32 is a curvature radius of an image side lens surface of said lens prism, L1 is an air equivalent distance in mm from a middle imaging surface to the object side lens surface of said lens prism, and L2 is a distance in mm from the middle imaging surface to said image side lens surface of the lens prism.

5. An imaging apparatus according to claim 4, wherein the image side lens surface of said lens prism of said third lens group includes an aspherical surface with a curvature that is reduced farther from the optical axis.

6. An imaging apparatus according to claims 4 or 5: wherein said second lens group of said objective optical system is designed to satisfy the following expression (5):

$$\beta 2t/\beta 2w \geq 2.5 \tag{5}$$

where β2 w is a lateral magnification at the wide angle end of said second lens group, and β2 t is a lateral magnification at the telescopic end of said second lens group.

7. A variable power finder comprising:

an objective optical system having a positive refractive force;

an inverting optical system for converting an inverted image taken by said objective optical system into an erecting image; and an ocular optical system having a positive refractive force to observe said erecting image obtained by said inverting optical system, said objective optical system, said inverting optical system, and said ocular optical system being arranged in order from an object side, wherein said objective optical system including a negative first lens group, a positive second lens group, and a positive third lens group, an image side lens surface and an object side lens surface of each of the first and second lens group including a respective aspherical surface, said second lens group configured to be displaced along an optical axis to provide the variable power and to compensate a visibility change caused by said variable power through said displacement of said first lens group, and said third lens group includes a lens prism having two reflection surfaces on separate sides of the lens prism and two convex refraction surfaces adjacent each other on a common side of the lens prism, said two convex refraction surfaces forming an entrance face and an exit face of the lens prism on said common side.

8. An imaging apparatus having a variable power finder, said finder comprising:

an objective optical system having a positive refractive force;

an inverting optical system for converting an inverted image taken by said objective optical system into an erecting image; and an ocular optical system having a positive refractive force to observe said erecting image obtained by said inverting optical system, said objective optical system, said inverting optical system, and said ocular optical system being arranged in order from an object side, wherein said objective optical system including a negative first lens group, a positive second lens group, and a positive third lens group, an image side lens surface and an object side lens surface of each of the first and second lens group including a respective aspherical surface, said second lens group configured to be displaced along an optical axis to provide variable power and to compensate a visibility change caused by said variable power through said displacement of said first lens group, and said third lens group includes a lens prism having two reflection surfaces on separate sides of the lens prism and two convex refraction surfaces adjacent each other on a common side of the lens prism, said two convex refraction surfaces forming an entrance face and an exit face of the lens prism on said common side.

* * * * *